(No Model.)
G. A. WRIGHT, L. H. FOWLER & S. SHAW.
TWO WHEELED VEHICLE.
No. 269,982.          Patented Jan. 2, 1883.
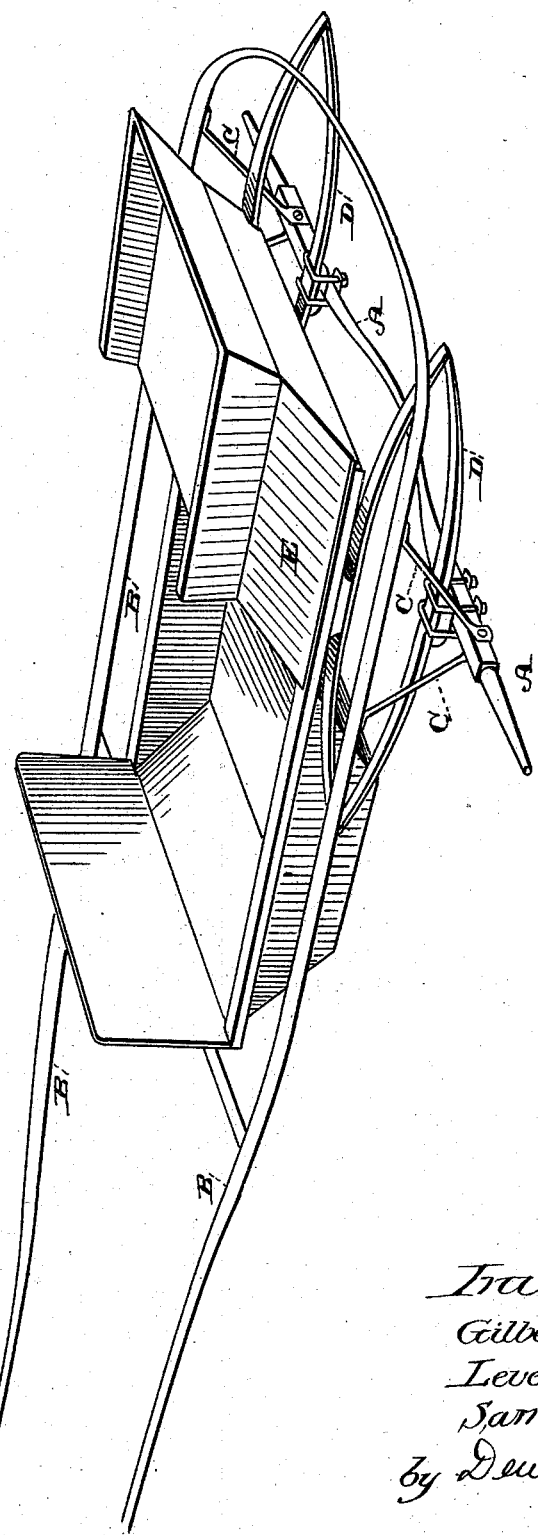
Witnesses:
R. N. Evans
T. W. Fowler
Inventors:
Gilbert A. Wright,
Leven H. Fowler,
Samuel Shaw,
by Dewey & Co.
Attorneys

UNITED STATES PATENT OFFICE.

GILBERT A. WRIGHT, LEVEN H. FOWLER, AND SAMUEL SHAW, OF NAPA CITY, CALIFORNIA.

TWO-WHEELED VEHICLE.

SPECIFICATION forming part of Letters Patent No. 269,982, dated January 2, 1883.

Application filed May 12, 1882. (No model.)

*To all whom it may concern:*

Be it known that we, GILBERT A. WRIGHT, LEVEN H. FOWLER, and SAMUEL SHAW, all of Napa City, county of Napa, State of California, have invented an Improved Two-Wheel Vehicle; and we hereby declare the following to be a full, clear, and complete description thereof.

Our invention relates to the class of two-wheel vehicles commonly known as "carts;" and it consists in a novel arrangement of the shafts with respect to the axle, and of the body with respect to the shafts, as will hereinafter fully appear.

The object of our invention is to overcome the unpleasant jogging motion of the horse which, in ordinary carts, is communicated to the seat or body and renders vehicles of this class an undesirable mode of conveyance.

Referring to the accompanying drawing, the figure shows a perspective view of our vehicle.

Let A represent the axle of the vehicle. B are the shafts. These reach back and over the axle at some little distance therefrom, and are carried around the back of the body in a curve, as shown. The shafts are secured to the axle indirectly and above it by means of the brackets or supports C.

D represents the springs. These are firmly clipped to the axle and lie within the shafts, which are wholly independent of them.

E is the body clipped to the springs. Its forward or foot portion extends down between the shafts, but is in no wise connected therewith, being free of all support except that which is afforded by its rear portion being clipped to and sustained by the springs.

The effect of this construction is as follows: When, as is usually the case, the shafts are connected with the body, the jogging of the horse is transmitted directly to the seat; likewise when the shafts are clipped to the axle their rise and fall communicates sufficient oscillatory motion to the axle to affect the seat in a similarly disagreeable manner; but when the shafts are disconnected from and independent of the body, the first disadvantage is avoided, and by being so indirectly connected with the axle they do not affect it to any sensible degree. The reason of this is that their motion is too far removed from the center—namely, the axle—about which they have to move, and when transmitted through a sufficiently long radius—the distance between shaft and axle—the motion is reduced to such an extent that it is not perceptible. Whatever motion there might be from this source is counteracted by the freedom which is given to the body, for the rider instinctively or naturally is inclined to maintain his equilibrium, which he can herein readily accomplish because of the non-connections of the body. The shafts, by being continued behind the body, add strength and grace to the vehicle.

Having thus described our invention, what we claim as new, and desire to secure by Letters Patent, is—

In a two-wheel vehicle, the shafts B, axle A, and brackets C, securing the two as shown, in combination with the springs D, clipped to the axle, and the body E, clipped to the springs, and having its forward end independent of the shafts, arranged substantially as and for the purpose herein described.

In witness whereof we hereto set our hands.

GILBERT A. WRIGHT.
  LEVEN H. FOWLER.
  SAMUEL SHAW.

Witnesses:
 WILLIAM ANDREWS,
 S. M. TOOL.